(12) United States Patent
Jia et al.

(10) Patent No.: US 8,031,693 B2
(45) Date of Patent: Oct. 4, 2011

(54) SYSTEM AND METHOD FOR TIMING SYNCHRONIZATION

(75) Inventors: Yongkang Jia, Kanata (CA); James Earl Womack, Bedford, TX (US); Zhijun Cai, Euless, TX (US); Shouxing Qu, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 871 days.

(21) Appl. No.: 11/943,417

(22) Filed: Nov. 20, 2007

(65) Prior Publication Data

US 2009/0129312 A1    May 21, 2009

(51) Int. Cl.
*H04J 3/06* (2006.01)
(52) U.S. Cl. ........................................ 370/350; 370/503
(58) Field of Classification Search .................. None
See application file for complete search history.

(56) References Cited

U.S. PATENT DOCUMENTS

| | | | | |
|---|---|---|---|---|
| 6,477,151 B1* | 11/2002 | Oksala | ........................ | 370/350 |
| 6,922,388 B1* | 7/2005 | Laroia et al. | .................. | 370/208 |
| 6,930,470 B2* | 8/2005 | Periyalwar et al. | ........... | 370/204 |
| 6,967,936 B1* | 11/2005 | Laroia et al. | .................. | 370/208 |
| RE39,673 E * | 6/2007 | Lee et al. | ...................... | 370/342 |
| 7,720,038 B2* | 5/2010 | Bennett | ........................ | 370/338 |
| 2005/0191965 A1* | 9/2005 | Yu et al. | ..................... | 455/67.16 |
| 2006/0035643 A1* | 2/2006 | Vook et al. | ..................... | 455/450 |
| 2007/0115796 A1* | 5/2007 | Jeong et al. | .................... | 370/203 |
| 2008/0233945 A1* | 9/2008 | Gummadi et al. | ............ | 370/208 |
| 2010/0214969 A1* | 8/2010 | Lamm et al. | ................... | 370/311 |

OTHER PUBLICATIONS

Second European Examination Report; EP Application No. 0712243702; Apr. 14, 2009; 4 pgs.
European Search Report; EP Patent Application No. EP07122437.2-2411; May 16, 2008; 8 pgs.
Research in Motion, Ltd.; "SRS Transmission Support in DRX Mode"; TSG-RAN WG2 #61; R2-080808; Sorrento, Italy; Feb. 11-15, 2008.
Nokia Siemens Networks, Nokia; "UL Sounding Arrangement"; 3GPP TSG RAN WG1 Meeting #50; R1-073642; Athens, Greece; Aug. 20-24, 2007; 5 pgs.
Samsung; "UL Control Transmissions During DRX ?"; 3GPP TSG-RAN2 Meeting #59; R2-073310; Athens, Greece; Aug. 20-24, 2007; 3 pgs.
Nokia, Nokia Siemens Network; "DRX Considerations"; 3GPP TSG-RAN WG2 Meeting #59; R2-073284; Athens, Greece; Aug. 20-24, 2007; 5 pgs.
Panasonic; "PUCCH Handling During DRX"; 3GPP TSG RAN WG2 #59; R2-073264; Athens, Greece; Aug. 20-24, 2007; 4 pgs.
Samsung; "UL Timing Sync Procedure"; 3GPP TSG RAN2#52; R2-0601006; Athens, Greece; Mar. 27-31, 2006; 4 pgs.
Jia,Yongkang, et al.; U.S. Appl. No. 12/778,863; filed May 10, 2010; Title: System and Method for Timing Synchronization.
European Examination Report; EP Application No. 07122437.2; Feb. 11, 2011; 4 pgs.
European Extended Search Report; EP Application No. 11163510.8; Jul. 6, 2011; 8 pgs.
European Summons to Attend Oral Proceedings Pursuant to Rule 115(1) EPC; EP Application No. 07122437.2; Aug. 16, 2011; 5 pgs.

* cited by examiner

*Primary Examiner* — Steven H Nguyen
(74) *Attorney, Agent, or Firm* — Conley Rose, P.C.; J. Robert Brown, Jr.

(57) ABSTRACT

The present disclosure relates generally to systems and methods for timing synchronization. Uplink synchronization is a necessary component of a UE operating in a mobile, wireless network. Reliable uplink synchronization generally requires regular uplink transmission containing reference signals. A method is provided that defines a burst period for sending the reference signals, determines an interval between the reference signals, and sends a timing instruction message that includes the burst period and the determined interval. A second method is provided that receives the timing instruction message and sends the reference signals in accordance with the timing instruction.

18 Claims, 9 Drawing Sheets

| UE Velocity (km/h) | | 30 | 60 | 120 | 360 | 500 |
|---|---|---|---|---|---|---|
| Num of symbols for averaging | | 20 | 20 | 20 | 20 | 20 |
| SRS repeating freq (Hz) | | 20 | 20 | 20 | 20 | 20 |
| Timing estimate error | Mean(us) | 0.26 | 0.29 | 0.35 | 0.57 | 0.69 |
| | Std(us) | 0.11 | 0.11 | 0.12 | 0.19 | 0.25 |
| | 95-prct(us) | 0.22 | 0.22 | 0.23 | 0.32 | 0.48 |

| UE Velocity (km/h) | | 30 | 60 | 120 | 360 | 500 |
|---|---|---|---|---|---|---|
| Num of symbols for averaging | | 20 | 20 | 20 | 20 | 20 |
| SRS repeating freq (Hz) | | 20 | 20 | 50 | 100 | 200 |
| Timing estimate error | Mean(us) | 0.26 | 0.29 | 0.29 | 0.33 | 0.32 |
| | Std(us) | 0.11 | 0.11 | 0.12 | 0.12 | 0.12 |
| | 95-prct(us) | 0.22 | 0.22 | 0.22 | 0.23 | 0.22 |

Figure 5

SYSTEM AND METHOD FOR TIMING SYNCHRONIZATION

FIELD OF THE INVENTION

The present disclosure relates generally to systems and methods for timing synchronization.

BACKGROUND

The telecommunications industry is a dynamic industry. Today's telecommunications industry comprises a variety of different radio access technologies including Code Division Multiple Access (CDMA2000), UTRAN (UTMS (Universal Mobile Telecommunications System) Terrestrial Radio Access Network), Global System for Mobile Communications (GSM), GSM EDGE Radio Access Network (GERAN), Generic Access Network (GAN), Wireless Fidelity (WiFi), Wireless Local Area Network (WLAN), General Packet Radio Service (GPRS), Worldwide Interoperability for Microwave Access (WiMAX), 1× Evolution-Data Optimized (1× EV-DO), High-Speed Downlink Packet Access (HS-DPA), Digital Enhanced Cordless Technology (DECT), and High Rate Packet Data (HRPD). Other RATs or other network technologies based on these RATs may be familiar to one of skill in the art.

Future telecommunications technologies are evolving including next generation networks or next generation equipment that may be referred to as long-term evolution equipment (LTE). As the technologies evolve, the vocabulary also changes. Traditional networks referred to base stations, cells, and user terminals. In next generation systems, the equivalent or similar equipment is referred to as enhanced Node B (eNB), hotspots, and user equipment (UE). For ease of understanding, a device used by the user is referred to herein as user equipment (UE). A device in which the user equipment accesses a network is referred to herein as network access equipment (e.g. base stations, or eNBs). The area in which a UE can access the network access equipment is referred to as a cell. One skilled in the art will appreciate that there may be instances where a first UE can be used by a second UE to access a network. In this example, the first HE is may also be referred to as network access equipment.

Other terms that will be used through out this disclosure include uplink and downlink. Uplink (UL) is a communication originating at the UE. Downlink (DL) is a communication terminating at the UE.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a table showing results from a simulation of the periodic SRS transmission scheme of FIG. 4.

DETAILED DESCRIPTION

Uplink (UL) synchronization is a necessary component of a UE operating in a mobile, wireless network. Reliable UL synchronization generally requires regular UL transmissions containing reference signals. The reference signals enable the network access equipment to measure and then adjust the timing differences between the UE and the network access equipment. These timing differences have many causes including clock drift, changes in the distance between the UE and the network access equipment due to the velocity of the UE, and changes in the multipath environment. However, traditional UL synchronization techniques may degrade as the UE's velocity increases. The following disclosure is provided in light of these technical challenges.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Thus, although the following is an example of how the present invention may be used in a $3^{rd}$ Generation Partnership Project (3GPP) long term evolution (LTE) network, one skilled in the art will understand that these concepts can be applied to other wireless networks.

Figure 1:
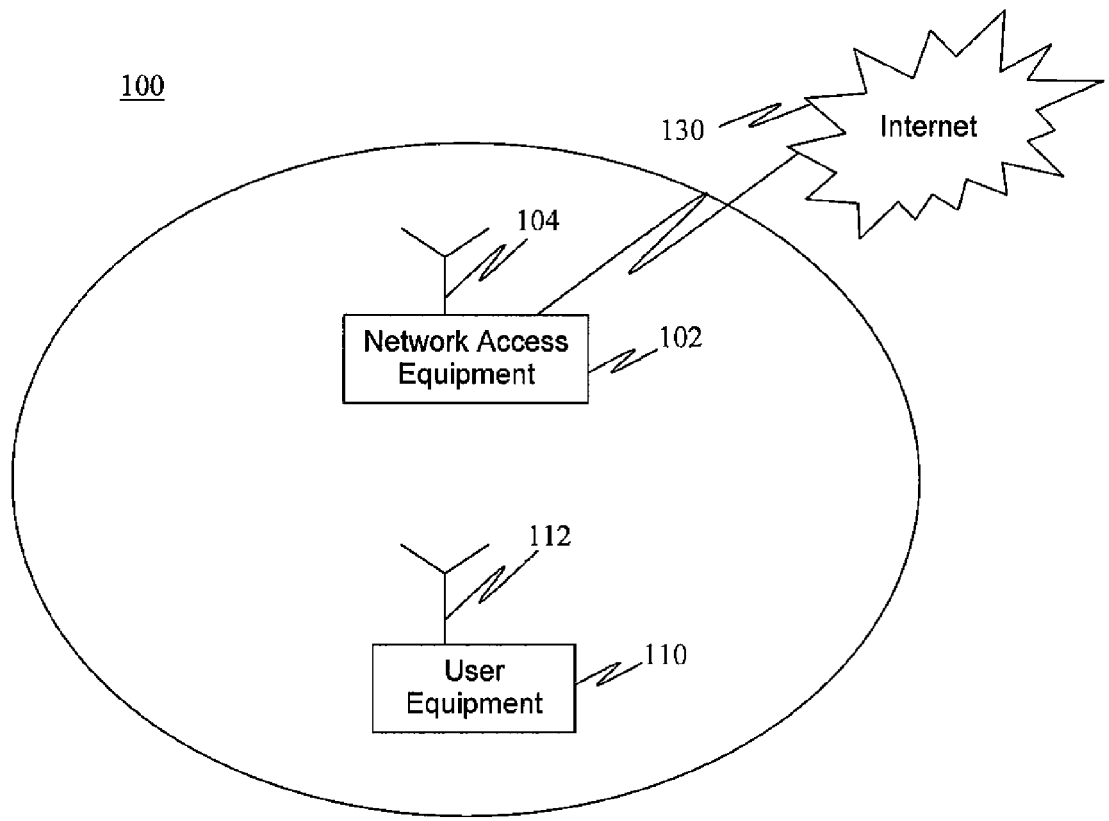
FIG. 1 illustrates a wireless system in which the present invention may be utilized.

FIG. 1 illustrates a wireless system 100 in which the present invention may be utilized. The wireless system 100 comprises network access equipment (NAE) 102, network access equipment antenna 104, user equipment (UE) 110 and UE antenna 112. The UE may be a cell phone, a personal digital assistant, a smart phone, a pager, a laptop computer, or any device which communicates with network access equipment 102. The network access equipment 102 is coupled to the Internet 130. The wireless system 100 allows the UE 110 to perform any, or a combination, of a variety of functions such as, making and receiving calls, surfing the web, sending text messages, and receiving emails.

The UE 110 and the NAE 102 communicate using a protocol that is specific to the type of wireless network 100. For example, for LTE, there is a basic format of the uplink (UL) channel. The transmission can be one of a number of different bandwidths (viz. 1.25, 5, 15 or 20 Megahertz (MHz)). In the time domain, the UL is broken into frames and sub-frames. A slot can be made up of seven orthogonal frequency division multiplexed (OFDM) symbols. Two slots make up a sub-frame. A frame is a collection of 10 continuous sub-frames. The first symbol of the sub-frame is where the sounding reference symbol (SRS) is placed. The demodulation (DM)

reference symbol (RS) is placed in the fourth symbol of each slot, and the control channel is taken up by at least one resource block(s) on the very outside edges of the frequency band. Because the SRS symbol is not sent in the control channel, the SRS symbol is sent intermixed with the data. The SRS that is made available at the beginning of each sub-frame is broken down into several resource blocks (e.g., 12 sub-carriers wide and several symbols in time). A UE may use one or all of those resource blocks given the transmission bandwidth. The SRS symbol is used by the network access equipment, e.g., enhanced Node B (eNB), to measure the channel quality, e.g., channel quality indicator (CQI), for the uplink.

Figure 2:
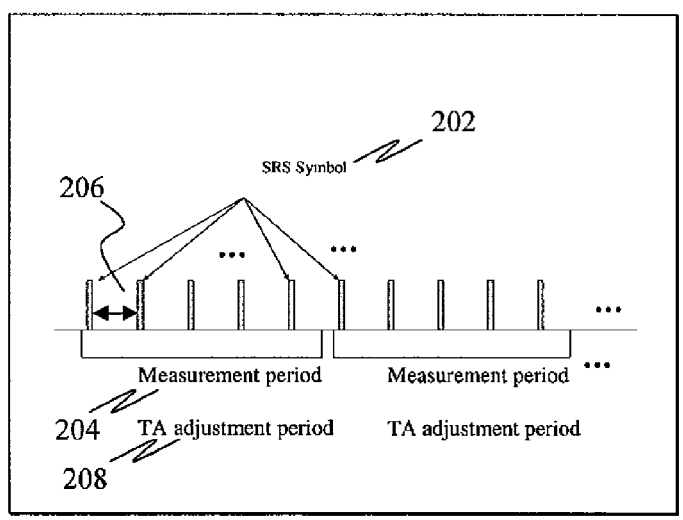
FIG. 2 illustrates a periodic SRS transmission scheme.

FIG. 2 illustrates a periodic SRS transmission scheme. With a known symbol sequence modulated in the SRS 202, the eNB can not only measure the CQI, but the eNB can also measure the UE's timing drift as well. At the cell edge, the limited signal to noise ratio (SNR) requires using multiple SRS 202 transmissions, with certain combination techniques, to be discussed in further detail, to increase the timing estimate accuracy.

Figures 3, 4:
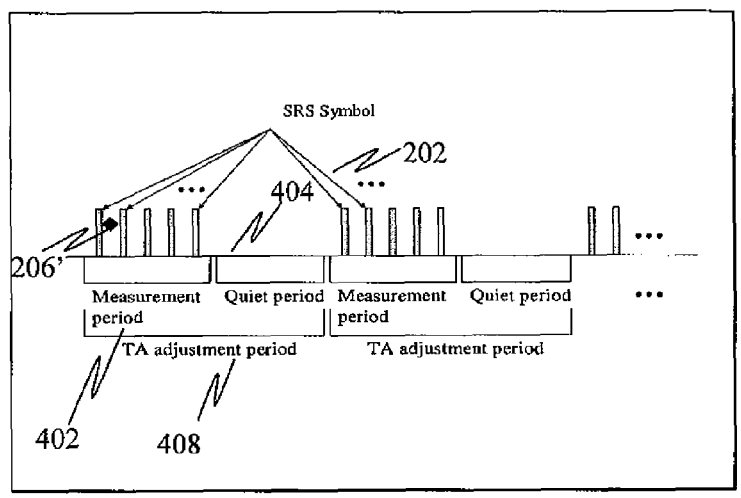
FIG. 3 is a table showing results from a simulation of the periodic SRS transmission scheme of FIG. 2.
FIG. 4 illustrates a periodic SRS transmission scheme in accordance with the present invention.

As illustrated in FIG. 2, the measurement period 204 is the same as the timing advance (TA) adjustment period 208; though sometimes the TA adjustment may not be updated if the timing drift is smaller than the TA granularity. In FIG. 2, the SRS symbols 202 that are used for one timing estimate are spread over one period 204 with equal intervals 206. With low UE velocity, the timing drift from the beginning to the end of the measurement period 204 is not significant and its effect on the timing estimation is small. However, when the UE's velocity is high, the timing drift becomes more substantial. Most TA adjustment measurements incorporate several samples over time (e.g., readings from several SRS). The movement of the UE from sample to sample during this measurement period 204 becomes significant with adverse effects on the overall timing estimate accuracy by the eNB. FIG. 3 is a result from a simulation that shows that the timing estimate degrades as the UE velocity increases when the SRS symbols 202 are transmitted in the manner illustrated in FIG. 2.

As illustrated in FIG. 3, as the UE velocity increases from 30 kilometers/hour (km/h) to 500 km/h, the mean timing estimate error increases from 0.26 microseconds (μs) to 0.69 μs, and the $95^{th}$ percentile increases from 0.22 μs to 0.48 μs. In order to overcome this timing error increase, the number of SRS symbols 202 sent in a measurement period 204 could be increased, but this solution decreases the capacity available for other messages utilizing the radio link, and also decreases the UE's battery life.

Another alternative, that will decrease the capacity and drain the UE's battery less, is illustrated in FIG. 4. As illustrated in FIG. 4, the SRS symbols 202 are sent in a burst 402, and then the SRS symbols 202 are not sent during a quiet period 404. The overall rate of the SRS symbol transmission is constant, e.g., the same numbers of SRS symbols 202 are sent during a TA adjustment period 408, e.g. 20; however, the interval 206 and 206' between the SRS symbols 202 is changed to allow for a burst period 402 and a quiet period 404.

In one embodiment, the interval 206' is varied depending on the velocity of the UE. For example, as the velocity of the UE increase, the interval 206' decreases. The interval 206' is lower-bounded by the channel coherent time. To get time domain diversity, the interval 206' should not be so small that a completely coherent radio propagation channel realization can be avoided in one measurement period.

In one embodiment, the burst period 402 and the quiet period 404 comprise the timing advance (TA) adjustment period 408. The TA adjustment period 408 may also be determined by the UE velocity. The lower the velocity, the longer the TA adjustment period. The TA adjustment period is determined by how much timing error the UL can tolerate before communications from one UE begins to interfere with communications of another. Thus, the TA adjustment period 408 takes into account the radio roundtrip timing for a UE with a given velocity.

In one embodiment, the network access equipment notifies the UE of the interval 206'. The notification can take place during a timing adjustment update message, or through an independent message.

For example, in one embodiment, a UE is in an LTE_Idle state when no active communication with the eNB is imminent. When there is a possibility for active communication (i.e., packets need to be sent on the uplink or downlink), the UE will be in an LTE_Connected state. In the transition from LTE_Idle to LTE_Connected state, the UE will acquire uplink timing alignment that needs to be maintained. Once UL timing alignment is acquired, the eNB will signal the UE default SRS burst pattern parameters as soon as necessary so that there is not enough time to pass before the UE loses timing alignment. An example of the signaling would be that the UE should use an SRS burst period and length suited for the highest mobility UE and the time that it should start the burst. The eNB will monitor these burst and other parameters available to it (e.g. changes in channel conditions) that it can use to determine the UE's velocity. At any time that the eNB determines that the UE is moving at a velocity that warrants a different set of burst parameters, it will signal them to the UE.

While the UE is in LTE_Connected mode, it may also be monitoring other parameters that indicate a change in its velocity (e.g., GPS measurements). It may signal this to the eNB and allow the eNB to incorporate that information to determine velocity. If the result is an indication that the velocity requires a different set of SRS burst parameters, the eNB will signal them to the UE.

FIG. 5 is a result from a simulation that shows that the timing estimate varies only slightly as the UE velocity increases when the SRS symbols 202 are transmitted in the manner illustrated in FIG. 4. As shown in FIG. 5, as the UE velocity increases from 30 km/h to 500 km/h the mean timing estimate error increases only slightly from 0.26 to 0.32 its, and the $95^{th}$ percentile is almost constant. Thus, the synchronization scheme shown in FIG. 4 has a mean timing estimate degradation of 0.08 μs compared with the 0.33 μs degradation when the synchronization scheme of FIG. 2 is used. Additionally, the synchronization scheme shown in FIG. 4 has almost no $95^{th}$ percentile degradation compared with the 0.26 μs degradation when the synchronization scheme of FIG. 2 is used. While, the synchronization schemes illustrated in FIG. 2 and FIG. 4 use the same capacity, e.g., radio resources, and battery power for uplink timing synchronization, the synchronization scheme in FIG. 4 results in less degradation of the timing estimate performance with different UE velocities.

Figure 6:
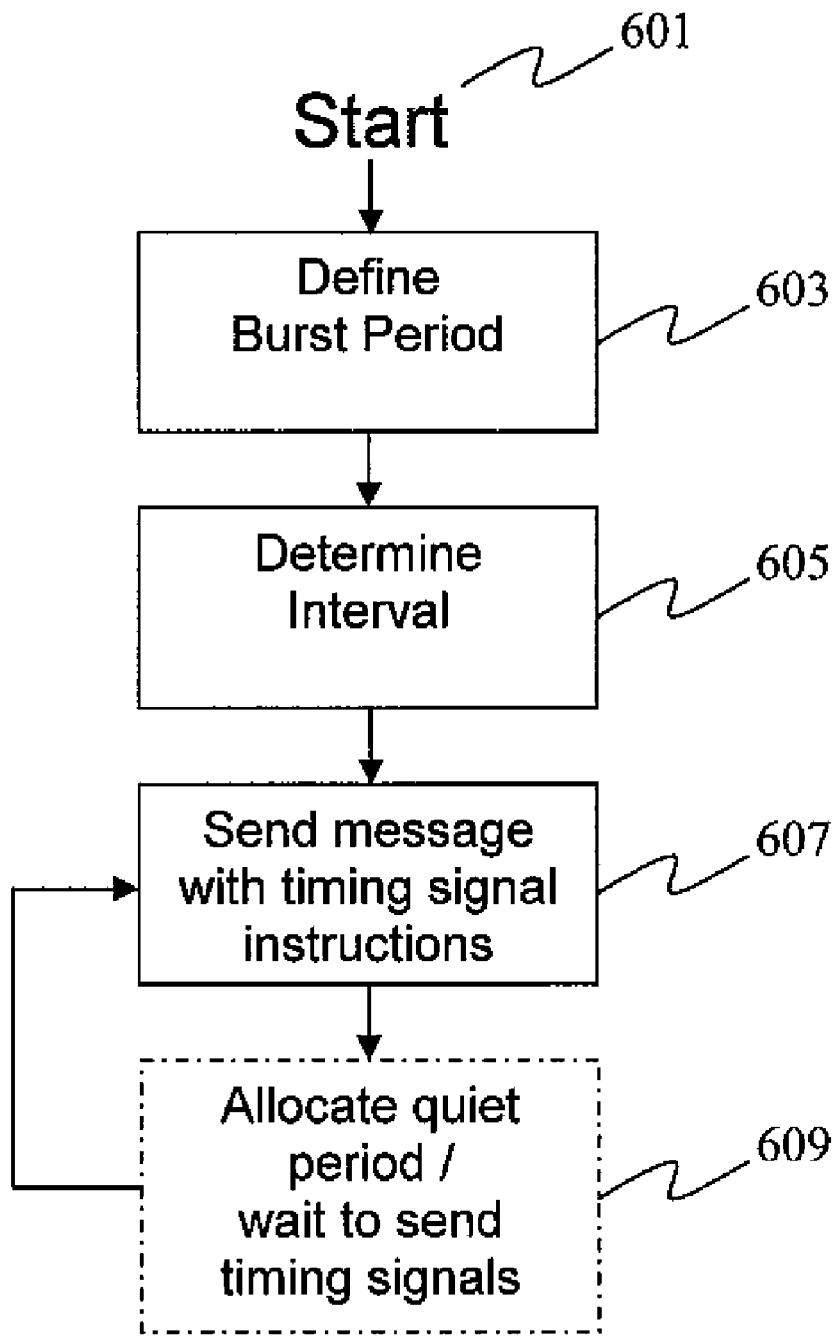
FIG. 6 is a schematic flowchart of a method in accordance with an embodiment of the present invention.

FIG. 6 is a schematic flowchart of a method in accordance with an embodiment of the present invention. As shown, method 600 begins at block 601 and at block 603 defines a burst period (e.g., burst period 402 illustrated in FIG. 4). Method 600 then proceeds to block 605 where method 600 determines an interval (e.g., interval 206' illustrated in FIG. 4). Method 600 then proceeds to block 607 where method 600 sends timing signal instructions (e.g., the burst period and interval timing). Method 600 may optionally proceed to block 609 which allocates a quiet period (e.g., quiet period 404 illustrated in FIG. 4). Method 600 then proceeds to send the timing signal instructions, which will include the optional quiet period timing instruction.

Figure 7:
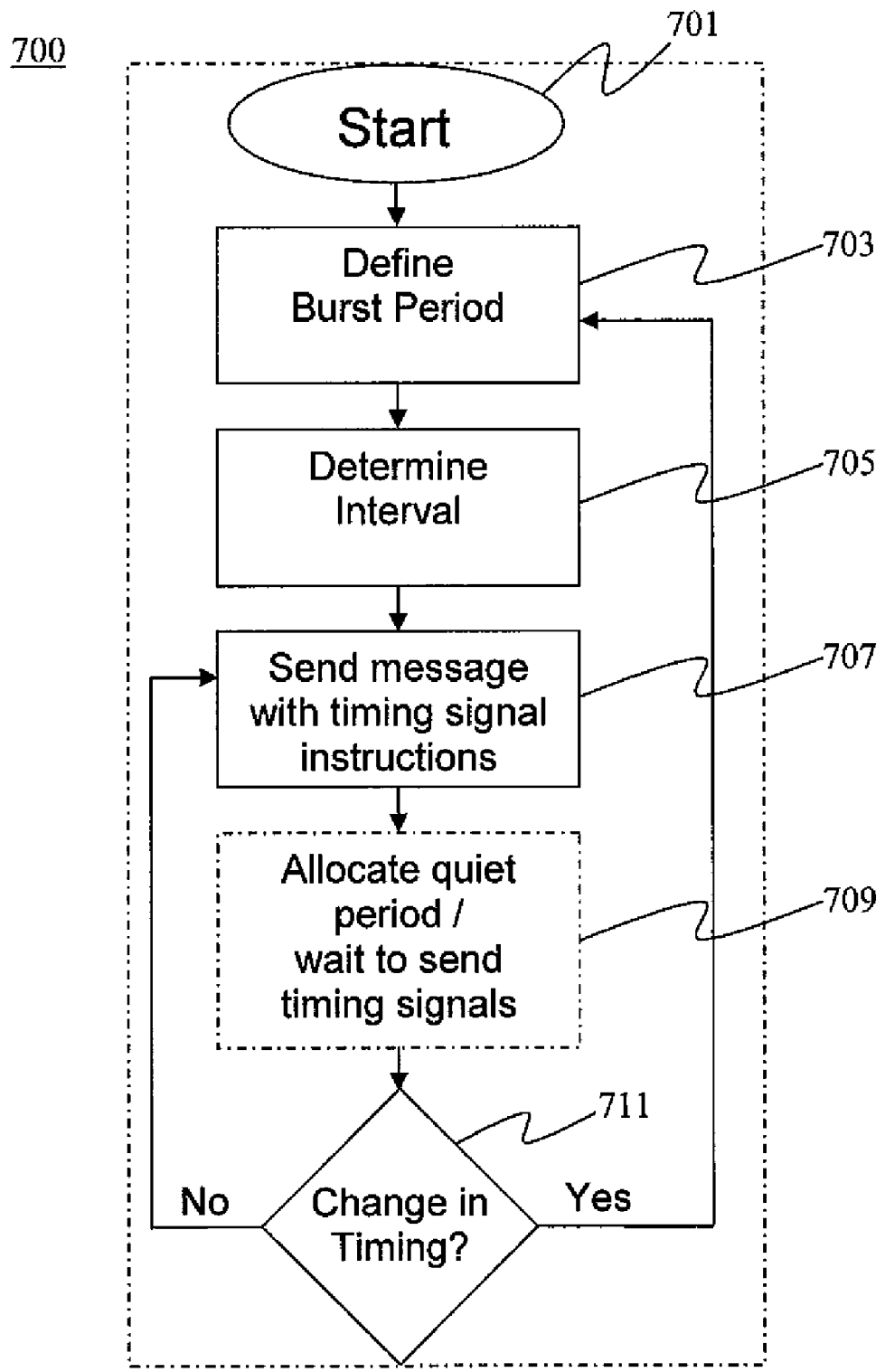
FIG. 7 is a schematic flowchart of a method in accordance with another embodiment of the present invention.

FIG. 7 is a schematic flowchart of a method in accordance with another embodiment of the present invention. As shown, method 700 begins at block 701 and at block 703 defines a burst period (e.g., burst period 402 illustrated in FIG. 4). Method 700 then proceeds to block 705 where method 700 determines an interval (e.g., interval 206' illustrated in FIG. 4). Method 700 then proceeds to block 707 where method 700 sends timing signal instructions (e.g., burst period and interval duration). Method 700 may optionally proceed to block 709 which allocates a quiet period. Method 700 then proceeds to send timing signal instructions which include quiet period duration. Method 700 may proceed from block 707 directly to block 711, or method 700 may proceed from block 707 to block 709 and then to block 711. At block 711, method 700 checks if there has been a change in timing. There are many methods that may be used to determine if there has been a change in timing. In one embodiment, the time drift rate, e.g., the timing drift of a current measurement compared to a previous measurement, can be used. Other methods include, using an accelerometer or GPS locations to determine if there has been a change in timing. A change in location, as determined by GPS positions, could indicate a change in timing. In one embodiment, the network access equipment determines if there has been a change in timing based on measurements made at the network access equipment. In another embodiment, the network access equipment determines if there has been a change in timing based on information received from the UE. In another embodiment, the network access equipment uses information based on measurement and information from the UE to determine there has been a change in timing.

If there has been a change in timing, the method 700 then proceed back to block 703 to re-define the burst period. Next, method 700 proceeds to block 705 to re-determine the interval. And, method 700 proceeds to block 707 to send the timing signal instructions including the re-defined burst period at the re-determined interval. If there has been no change in timing, or if method 700 determines that the burst period does not have to be re-defined, and the interval does not need to be re-determined, method 700 then proceeds back to block 707 to send the original timing signal instructions. Alternatively, the network access equipment does not send timing signal instructions until there is a change in the timing signal instructions.

Figure 8:
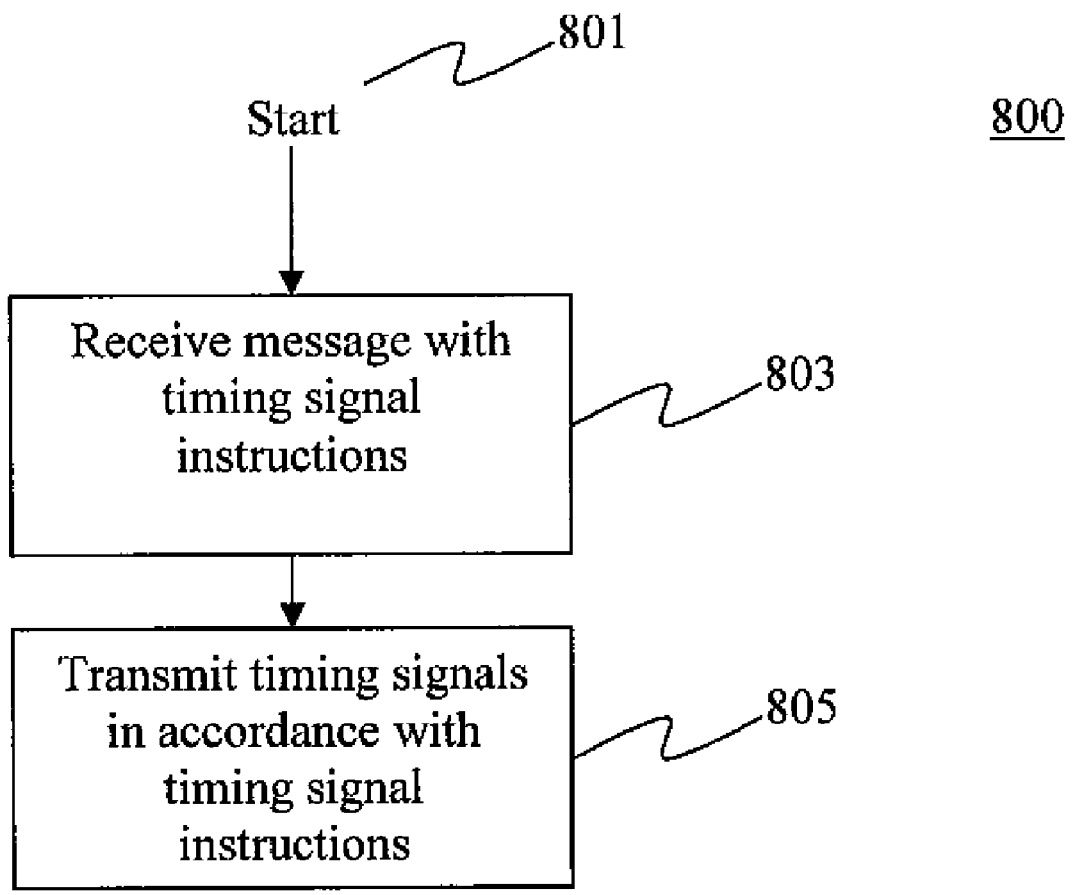
FIG. 8 is a schematic flowchart of a method in accordance with an embodiment of the present invention.

FIG. 8 is a schematic flowchart of a method 800 in accordance with the present invention. FIG. 8 starts at Start 801. Method 800 then proceeds to block 803, where a message that includes the timing signal instructions is received. These timing signal instructions comprise burst period and interval timing instructions, along with the optional quiet period instructions. In one embodiment, these timing signal instructions may also include the number of timing signals to be sent. The method 800 then proceeds to block 805, where the timing signals are transmitted in accordance with the timing signal instructions. In one embodiment, the timing signals are the SRS timing signals 202, as shown in FIG. 4, where the SRS timing signals 202 are sent for the instructed burst period 402 and at the instructed interval 206'.

Figure 9:
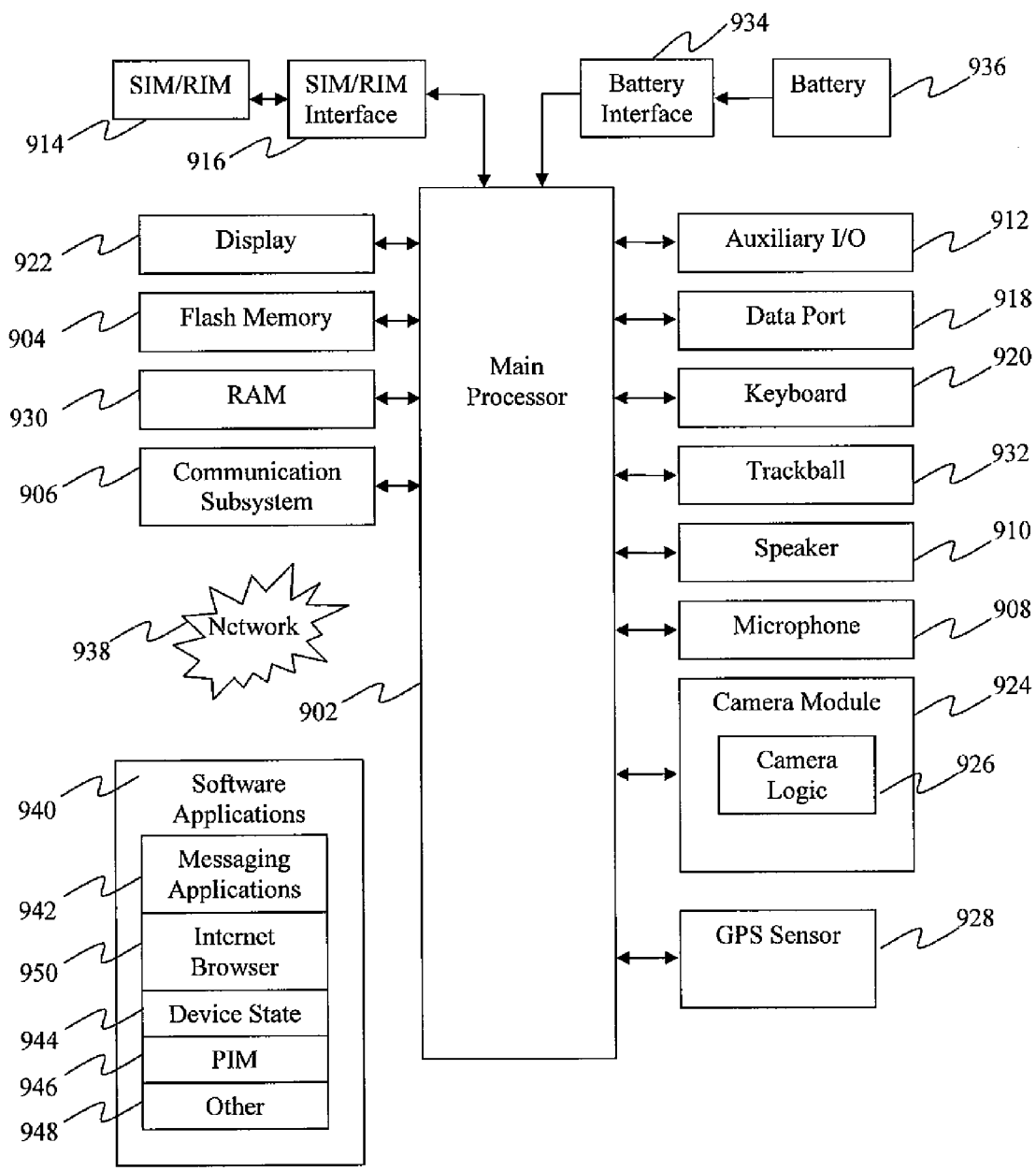
FIG. 9 is a schematic block diagram of an illustrative user equipment in accordance with an embodiment of the present invention.

As mentioned previously, the invention may be practiced with a UE 110 in a wireless operating environment. Shown in FIG. 9 is a schematic block diagram of an illustrative UE 110, While a variety of known components of UEs 110 are depicted, in an embodiment a subset of the listed components and/or additional components not listed may be included in the UE 110. The UE 110 includes a main processor 902 and a memory 904. As shown, the UE 110 may further include a communication subsystem 906, random access memory 930, a microphone 908, an earpiece speaker 910, an input/output interface 912, a removable memory card 914, a removable memory card interface 916 a universal serial bus (USB) port 918, a keypad 920, a liquid crystal display (LCD) 922, which may include a touch sensitive surface, a camera module 924, a camera logic 926, and a global positioning system (GPS) sensor 928. In an embodiment, the UE 110 may include another kind of display that does not provide a touch sensitive screen. In an embodiment, the main processor may communicate directly with the memory 904.

The main processor 902 or some other form of controller or central processing unit operates to control the various components of the UE 110 in accordance with embedded software or firmware stored in memory 904 or stored in memory contained within the main processor 902 itself. In addition to the embedded software or firmware, the main processor 902 may execute other applications stored in the memory 904, or in RAM 930, or made available via information carrier media such as portable data storage media like the removable memory card 914 or via wired or wireless network communications. The application software may comprise a compiled set of machine-readable instructions that configure the main processor 902 to provide the desired functionality, or the application software may be high-level software instructions to be processed by an interpreter or compiler to indirectly configure the main processor 902.

The communication subsystem 906 may be provided to convert between wireless signals and electrical signals, enabling the UE 110 to send and receive information from a cellular network or some other available wireless communications network or from a peer UE 110. In an embodiment, the communication subsystem 906 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The communication subsystem 906 may include antenna tuning and/or impedance matching components, RF power amplifiers, and/or low noise amplifiers.

The communication subsystem 906 may also provide frequency shifting, converting received RF signals to baseband and converting baseband transmit signals to RF. In some descriptions the communication subsystem 906 may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the main processor 902 or other processing unit.

Main processor 902 may provide various analog processing of inputs and outputs, for example analog processing of inputs from the microphone 908 outputs to the speaker 910. To that end, the main processor 902 may have ports for connecting to the built-in microphone 908 and the speaker 910 that enable the UE 110 to be used as a cell phone. The main processor 902 may further include a port for connecting to a headset or other hands-free microphone and speaker configuration. The main processor 902 may provide digital-to-analog conversion in one signal direction and analog-to-digital conversion in the opposing signal direction. In some embodiments, at least some of the functionality of the main processor 902 may be provided by other digital processing components.

The main processor 902 may perform modulation/demodulation, coding/decoding, interleaving/deinterleaving, spreading/despreading, inverse fast Fourier transforming (IFFT)/fast Fourier transforming (AFT), cyclic prefix appending/removal, and other signal processing functions associated with wireless communications. In an embodiment, for example in a code division multiple access (CDMA) technology application, for a transmitter function the main processor 902 may perform modulation, coding, interleaving, and spreading, and for a receiver function the main processor 902 may perform despreading, deinterleaving, decoding, and demodulation. In another embodiment, for example in an orthogonal frequency division multiplex access (OFDMA) technology application, for the transmitter function the main processor 902 may perform modulation, coding, interleaving, inverse fast Fourier transforming, and cyclic prefix appending, and for a receiver function the main processor 902 may perform cyclic prefix removal, fast Fourier transforming, deinterleaving, decoding, and demodulation. In other wireless technology applications, yet other signal processing functions and combinations of signal processing functions may be performed by the main processor 902.

The main processor 902 may communicate with a wireless network 938. In some embodiments, the communication may provide Internet connectivity, enabling a user to gain access to content on the Internet and to send and receive e-mail or text messages. The input/output interface 912 interconnects the main processor 902 and various memories and interfaces. The memory 904, RAM 930 and the removable memory card 914 may provide software and data to configure the operation of the main processor 902.

The keypad 920 couples to the main processor 902 to provide one mechanism for the user to make selections, enter information, and otherwise provide input to the UE 110. The keyboard 902 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball 932, and other navigational or functional keys, which may be inwardly depressed to provide further input function. Another input mechanism may be the LCD, which may include touch screen capability and also display text and/or graphics to the user.

The camera 924, if equipped, enables the UE 110 to take digital pictures. The main processor 902 communicates with the camera 924 via the camera logic 926. The GPS sensor 928 is coupled to the main processor to decode global positioning system signals, thereby enabling the UE 110 to determine its position. Various other peripherals may also be included to provide additional functions, e.g., radio and television reception.

The UE 110 may be a battery-powered device and may include a battery interface 934 for receiving one or more rechargeable batteries 936. In some embodiments, the battery 936 may be a smart battery with an embedded microprocessor. The battery interface 934 is coupled to a regulator (not shown), which assists the battery 936 in providing power to the UE 110. The battery 936 may be used to power all components and modules in the UE 110.

Software applications 940 may also be stored in the memory 904 of the UE 110. The software applications 940 may include a messaging application 942. The messaging application 942 can be any suitable software program that allows a subscriber or user of the UE 110 to send and receive wireless communications, including text messages. Messages that have been sent or received are typically stored in memory 904, or in some other suitable storage element in the UE 110. In an alternative embodiment, some of the sent and received messages may be stored remotely.

The UE 110 may further include a device state module 944, a personal information manager (PIM) 946, an internet browser 950, and other various modules 948.

It will be appreciated that different UEs may have different capabilities. Thus, the above description is not intended to be exhaustive of all of the potential capabilities that could be provided in a UE. Further, some UEs may have fewer capabilities than described above. For example, a UE may not have a camera or GPS sensor.

Figure 10:
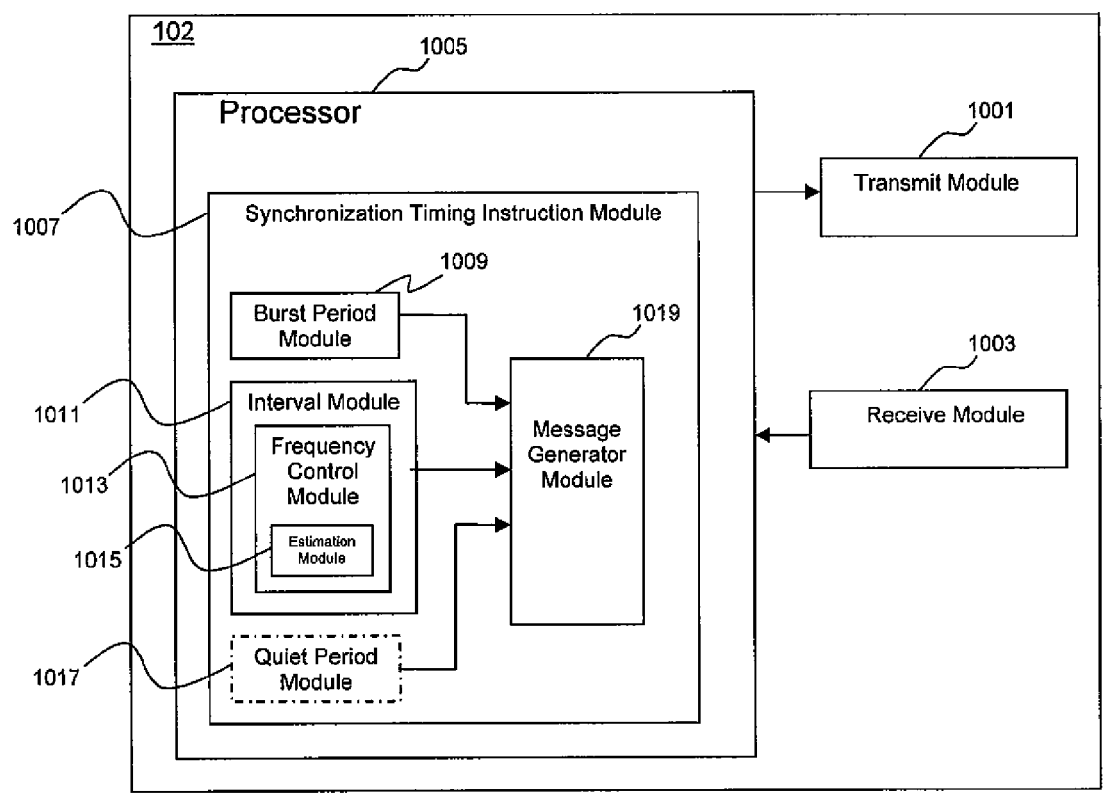
FIG. 10 illustrates a simplified block diagram of network access equipment in accordance of an embodiment of the present invention.

FIG. 10 illustrates a simplified block diagram of network access equipment 102. There are many configurations of network access equipment known to those of skill in the art, and the configuration of network access equipment will vary depending on the network. Network access equipment 102 comprises a transmit module 1001, a receive module 1003 and a processor 1005. One skilled in the art will appreciate that the transmit module 1001 and receive module 1003 may be combined into a single transceiver module. The transmit module 1001 and the receive module 1003 may be coupled to the same antenna 112, shown in FIG. 1, or to different antennas depending upon the configuration. In one embodiment, the processor 1005 comprises a memory not shown. The synchronization timing instruction module 1007 may be stored in the processor 1005, or in memory associated with the processor. The synchronization timing instruction module 1007 comprises a burst period module 1009, an interval module 1011, a message generator module 1019, and an optional quiet period module 1017. The interval module 1011 further comprises a frequency control module 1013 which further comprise an estimation module 1015.

The Burst period module 1009 defines the burst period 402 shown in FIG. 4. The interval module 1011 determines the interval 206' shown in FIG. 4. The burst period module 1009 sends the defined burst to the message generator module 1019, and the interval module sends the determined interval 206' to the message generator module 1019. The message generator module 1019 then sends timing signal instructions (e.g., burst period and interval duration) to the transmit module 1001. The transmit module 1001 may be used in conjunction with the antenna 112, shown in FIG. 1, to transmit the timing signal instructions from the network access equipment (e.g., eNB) to the UE.

In one embodiment, the network access equipment 102 contains a look-up table in memory. The network access equipment 102 estimates the velocity of a user equipment, as is described below, and uses the velocity estimate to determine a burst period and interval from the look-up table.

In one embodiment, the interval module 1011 comprises a frequency control module 1013. The frequency control module 1013 ascertains the repeating frequency of the timing signals in order to maintain synchronization. In one embodiment, the frequency control module 1013 may ascertain UL synchronization with the network access equipment using a small interval between timing sequences, e.g., the interval that would be required if the UE were traveling at 500 km/h, i.e., 200 Hz. Once UL synchronization has been established, the frequency control module 1013 may increase the interval between timing sequences for a given number of TA adjustment periods. For example, the frequency control module may increase the interval between timing sequences to the interval that would be required if the UE were traveling at 360 km/h, i.e., 100 Hz. If the UE continues to maintain UL synchronization, then the frequency control module 1013 may increase the interval again, until UL synchronization is lost. The network access equipment can then instruct the UE to return the last known successful interval between timing sequences, as that interval is the most optimum for the system at that time, or the UE can return to the last known successful interval without an instruction from the network access equipment. This process could be repeated periodically, or upon an event notification.

In another embodiment, the frequency control module 1013 could set the interval to a nominal rate, e.g., interval associated with a UE moving at 120 km/h. Then the frequency control module 1013 could decrease the interval until UL synchronization is lost or nearly lost.

In another embodiment, the frequency control module 1013 further comprises an estimation module 1015. The estimation module 1015 is capable of estimating the mobility of the user. In one embodiment, the estimation module 1015 can estimate both the absolute and relative velocity of the UE. The estimation module 1015 may include a low pass filter to improve the accuracy of velocity measurements. In general, the UE's relative velocity, i.e., the velocity towards or away from the network access equipment, will have a greater affect on the UL synchronization timing. In one embodiment, the estimation module 1015 may use the timing drift to estimate the relative velocity, where relative velocity=(T*C)/(2*burst period). Where T is the time drift in seconds, C is the speed of light, and the burst period is also in seconds.

In another embodiment, the estimation module 1015 receives input from the UE to determine the velocity. For example, the UE may provide position information (e.g., obtained from GPS) to the network access equipment. This position information may be used by the estimation module to determine the velocity of the UE.

In another embodiment, the interval module 1011 establishes a number of timing signals (e.g., SRS symbols 202) required per burst to maintain synchronization. While the simulations shown in FIGS. 3 and 5 show transmission of 20 SRS symbols, this is specific to an LTE system. If the LTE timing changes, or for other networks, it may be necessary to determine the number of timing signals required per burst to maintain synchronization. One manner of determining the number of timing signals is to send the maximum number of timing signals and then decrease the number of timing signals sent until the optimum number is reached.

Figure 11:
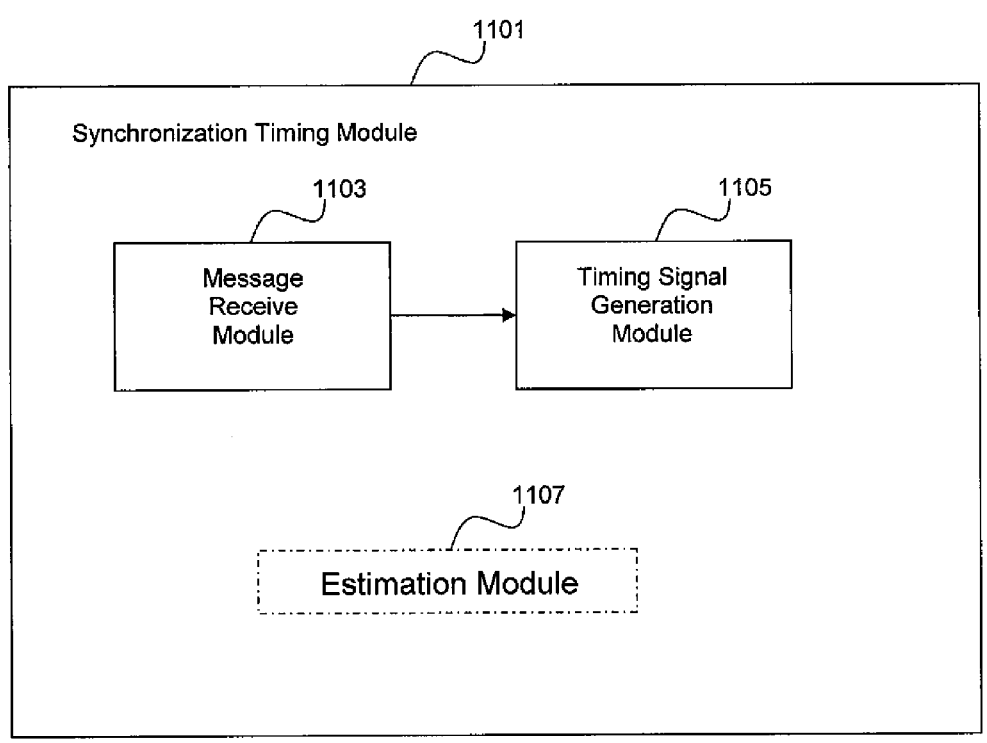
FIG. 11 illustrates synchronization timing module that may be sorted at the user equipment in accordance with the present invention.

FIG. 11 illustrates synchronization timing module 1101 that may be stored in memory 904, RAM 930, or within memory in the main processor 902 of the UE 110. The synchronization timing module 1011 comprises a message receive module 1103 and a timing signal generation module 1105. The message receive module 1103 may be used in conjunction with the communication subsystem 906, shown in FIG. 9, to receive timing signal instruction messages from the network access equipment 102. The timing signal instructions are sent to the timing signal generation module 1105. The timing signal generation module 1105, transmits the timing signals in accordance with the timing signal instructions. Thus, the UE will transmit timing signals, e.g., SRS signals 202 at the instructed interval 206' and for the instructed burst period 402. The timing signal generation module may be used in conjunction with the communication subsystem 906, shown in FIG. 9, to transmit the timing signals to the network access equipment 102.

In one embodiment, the synchronization timing module 1101 also includes an optional estimation module 1107. The estimation module 1107 is used to estimate the velocity of the UE. In one embodiment, the estimation module 1107 obtains information from the GPS sensor 928, shown in FIG. 9, and provides that information to the communication subsystem 906. The GPS information is then transmitted to the network access equipment 102. Alternatively, the estimation module 1107 may obtain information from the GPS sensor, estimate the velocity of the UE, and then provide the estimate to the communication subsystem 906 for transmission to the network access equipment 102.

It will be appreciated that the modules described above and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Modules may be contained within other.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method in a network access equipment of maintaining uplink synchronization comprising:

defining, by the network access equipment, a burst period for sending a plurality of timing signals, wherein the burst period is defined within a timing advance (TA) adjustment period comprising a measurement period and a quiet period, wherein the burst period corresponds to the measurement period, and wherein the quiet period corresponds to a time during the TA adjustment period in which sending the timing signals is avoided;

determining a number of timing signals required per burst period to maintain synchronization, the number being such that, relative to a prior TA adjustment period, a total number of timing signals within the TA adjustment period remains constant, and wherein the burst period is shorter than the prior TA adjustment period;

determining an interval between ones of the plurality of timing signals in the burst period; and sending a timing signal instruction message containing the burst period and the interval.

2. The method of claim 1, wherein the timing signal instruction message further contains the quiet period.

3. The method of claim 1, wherein determining an interval includes ascertaining a repeating frequency of the timing signals in order to maintain synchronization.

4. The method of claim 3, wherein ascertaining a repeating frequency includes estimating mobility of a user equipment.

5. The method of claim 1, further comprising:
establishing a change in a uplink timing alignment;
re-defining the burst period for sending the plurality of timing signals;
re-determining an interval between ones of the plurality of timing signals in the burst period; and
sending a second timing signal instruction message containing the re-defined burst period at the re-determined interval.

6. The method of claim 5, wherein the change in uplink timing alignment is caused by a change in a mobility of an user equipment.

7. A system for maintaining uplink synchronization in a network access equipment comprising:
a synchronization timing instruction module comprising:
a burst period module configured to define a burst period for sending
a plurality of timing signals, wherein the burst period is defined within a timing advance (TA) adjustment period comprising a measurement period and a quiet period, wherein the burst period corresponds to the measurement period, and wherein the quiet period corresponds to a time during the TA adjustment period in which sending the timing signals is avoided;
an interval module configured to determine a number of timing signals required per burst period to maintain synchronization, the number being such that, relative to a prior TA adjustment period a total number of timing signals within the TA adjustment period remains constant, and wherein the interval module is further configured to determine an interval between ones of the plurality of timing signals in the burst period; and
a message generator module coupled with the burst period module and the interval module, the message generator module configured to generate a timing signal instruction message comprising the burst period and the determined interval.

8. The system of claim 7, wherein the timing signal instruction message further comprises the quiet period.

9. The system of claim 7, wherein the interval module further comprises a frequency control module configured to ascertain a repeating frequency of the timing signals in order to maintain synchronization.

10. The system of claim 9, wherein the frequency control module includes an estimating module configured to estimate mobility of a user equipment, based upon receipt of the plurality of timing signals form the user equipment.

11. The system of claim 7, wherein the network access equipment is in a wireless, mobile system.

12. A method for uplink synchronization in an user equipment comprising:
Receiving, at the user equipment, a timing signal instruction message comprising a burst period, wherein the burst period is defined within a timing advance (TA) adjustment period comprising a measurement period and a quiet period, wherein the burst period corresponds to the measurement period and wherein the quiet period corresponds to a time during the TA adjustment period in which sending the timing signals is avoided, and wherein the timing signal instruction message further comprises an interval including a number of timing signals required per burst period to maintain synchronization, the number being such that, relative to a prior TA adjustment period, a total number of timing signals within the TA adjustment period remains constant, and wherein the burst period is shorter than the prior TA adjustment period; and
transmitting the number of timing signals for the burst period at the interval.

13. The method of claim 12, further comprising:
transmitting timing signals during the burst period at the interval;
waiting for a duration of the quiet period; and
transmitting timing signals during the burst period at the interval.

14. The method of claim 12, further comprising:
obtaining mobility information; and
sending the mobility information.

15. The method of claim 12, further comprising:
estimating a mobility of the user equipment; and
sending the estimate.

16. A method for maintaining uplink synchronization in a wireless network comprising:
at a network access equipment:
defining a burst period for sending a plurality of timing signals, wherein the burst period is defined within a timing advance (TA) adjustment period comprising a measurement period and a quiet period, wherein the burst period corresponds to the measurement period, and wherein the quiet period corresponds to a time during the TA adjustment period in which sending the timing signals is avoided;
determining a number of timing signals required per burst period to maintain synchronization, the number being such that, relative to a prior TA adjustment period, a total number of timing signals within the TA adjustment period remains constant, and wherein the burst period is shorter than the prior TA adjustment period;
determining an interval between ones of the plurality of timing signals in the burst period; and
sending a timing signal instruction message containing the burst period and interval;
at a user equipment:
receiving the timing signal instruction; and
sending the plurality of timing signals in accordance with the timing signal instruction.

17. The method of claim 16, further comprising:
transmitting from the user equipment the timing signals for the burst period at the interval;
waiting for a duration of the quiet period; and
transmitting timing signals for the burst period at the interval.

18. The method of claim 16, further comprising:
determining a change in timing synchronization;
re-defining the burst period for sending the plurality of timing signals;
re-determining an interval between ones of the plurality of timing signals in the burst period;
sending a second timing signal instruction message containing the re-defined burst period at the re-determined interval, wherein the user equipment receives the second timing signal instruction message and sends the plurality of timing signals in accordance with the second timing signal instruction message.

* * * * *